US008709372B2

(12) United States Patent
Zhu et al.

(10) Patent No.: US 8,709,372 B2
(45) Date of Patent: Apr. 29, 2014

(54) CARBON NANOTUBE FIBER SPUN FROM WETTED RIBBON

(75) Inventors: Yuntian T. Zhu, Cary, NC (US); Paul Arendt, Los Alamos, NM (US); Xiefei Zhang, Chattanooga, TN (US); Qingwen Li, Jiangsu (CN); Lei Fu, Beijing (CN); Lianxi Zheng, Jurong West (SG)

(73) Assignee: Los Alamos National Security, LLC, Los Alamos, NM (US)

( * ) Notice: Subject to any disclaimer, the term of this patent is extended or adjusted under 35 U.S.C. 154(b) by 93 days.

(21) Appl. No.: 12/286,966

(22) Filed: Oct. 2, 2008

(65) Prior Publication Data

US 2009/0208742 A1 Aug. 20, 2009

Related U.S. Application Data

(60) Provisional application No. 60/998,461, filed on Oct. 2, 2007.

(51) Int. Cl.
*C10B 31/00* (2006.01)
*D01F 9/00* (2006.01)

(52) U.S. Cl.
USPC ............ 423/447.1; 423/414; 423/445 R; 264/103; 264/104; 264/105; 977/742; 977/752

(58) Field of Classification Search
USPC .......... 977/734, 742, 750, 752, 753; 264/103, 264/104, 105; 423/414, 445 R, 447.1
See application file for complete search history.

(56) References Cited

U.S. PATENT DOCUMENTS

| 6,682,677 | B2 | 1/2004 | Lobovsky et al. | |
|---|---|---|---|---|
| 7,247,290 | B2 | 7/2007 | Lobovsky et al. | |
| 2007/0116631 | A1* | 5/2007 | Li et al. | 423/447.3 |
| 2007/0166223 | A1 | 7/2007 | Jiang | |
| 2008/0170982 | A1* | 7/2008 | Zhang et al. | 423/447.3 |

FOREIGN PATENT DOCUMENTS

| WO | WO2004015786 | 2/2004 |
|---|---|---|
| WO | WO2007/015710 | 2/2007 |

OTHER PUBLICATIONS

Ci et al., "Double Wall Carbon Nanotubes Promoted by Sulfur in a Floating Iron Catalyst CVD System", Chemical Physics Letters 359 (Jun. 2002) 63-67.*
Ci et al., "Multifunctional Macroarchitectures of Double-Walled Carbon Nanotube Fibers", Advanced Materials, Jun. 1, 2007, 1719-1723.*
Google Search.*
Haggenmueller et al., "Aligned Single-Wall Carbon Nanotubes in Composites by Melt Processing Methods," Chemical Physics Letters, vol. 330 (Nov. 2000) pp. 219-225.
Zhang et al., "Rapid Growth of Well-Aligned Carbon Nanotube Arrays," Chemical Physics Letters, vol. 362 (Aug. 2002) pp. 285-290.

(Continued)

Primary Examiner — Matthew Matzek
(74) Attorney, Agent, or Firm — Baker & Hostetler LLP

(57) ABSTRACT

A fiber of carbon nanotubes was prepared by a wet-spinning method involving drawing carbon nanotubes away from a substantially aligned, supported array of carbon nanotubes to form a ribbon, wetting the ribbon with a liquid, and spinning a fiber from the wetted ribbon. The liquid can be a polymer solution and after forming the fiber, the polymer can be cured. The resulting fiber has a higher tensile strength and higher conductivity compared to dry-spun fibers and to wet-spun fibers prepared by other methods.

22 Claims, 5 Drawing Sheets

(56) References Cited

OTHER PUBLICATIONS

Jiang et al., "Spinning Continuous Carbon Nanotube Yarns," Nature, vol. 419 (Oct. 2002) p. 801.

Maruyama et al., "Low-Temperature Synthesis of High-Purity Single-Walled Carbon Nanotubes from Alcohol," Chemical Physics Letters, vol. 360 (Jul. 2002) pp. 229-234.

Safadi et al., "Multiwalled Carbon Nanotube Polymer Composites: Synthesis and Characterization of This Films," Journal of Applied Polymer Science, vol. 84 (Jun. 2002) pp. 2660-2669.

Demczyk et al., "Direct Mechanical Measurement of the Tensile Strength and Elastic Modulus of Multiwalled Carbon Nanotubes," Materials Science and Engineering A, vol. 334 (Sep. 2002) pp. 173-178.

Cadek et al., "Morphological and Mechanical Properties of Carbon-Nanotube-Reinforced Semicrystalline and Amorphous Polymer Composites," Applied Physics Letters, vol. 81 (Dec. 2002) pp. 5123-5125.

Dalton et al., "Super-Tough Carbon-Nanotube Fibres," Nature, vol. 423, (Jun. 2003) p. 703.

Penumadu et al., "Mechanical Properties of Blended Single-Wall Carbon Nanotube Composites," Materials Research Society, vol. 18 (Aug. 2003) pp. 1849-1853.

Coleman et al., "Improving the Mechanical Properties of Single-Walled Carbon Nanotube Sheets by Intercalation of Polymeric Adhesives," Applied Physics Letters, vol. 82 (Mar. 2003) pp. 1682-1684.

Zhang et al., "Multifunctional Carbon Nanotube Yarns by Downsizing an Ancient Technology," Science, vol. 306 (Nov. 2004) pp. 1358-1361.

Ci et al., "Multifunctional Macroarchitectures of Double-Walled Carbon Nanotube Fibers," Advanced Materials, vol. 19 (Jul. 2007) pp. 1719-1723.

\* cited by examiner

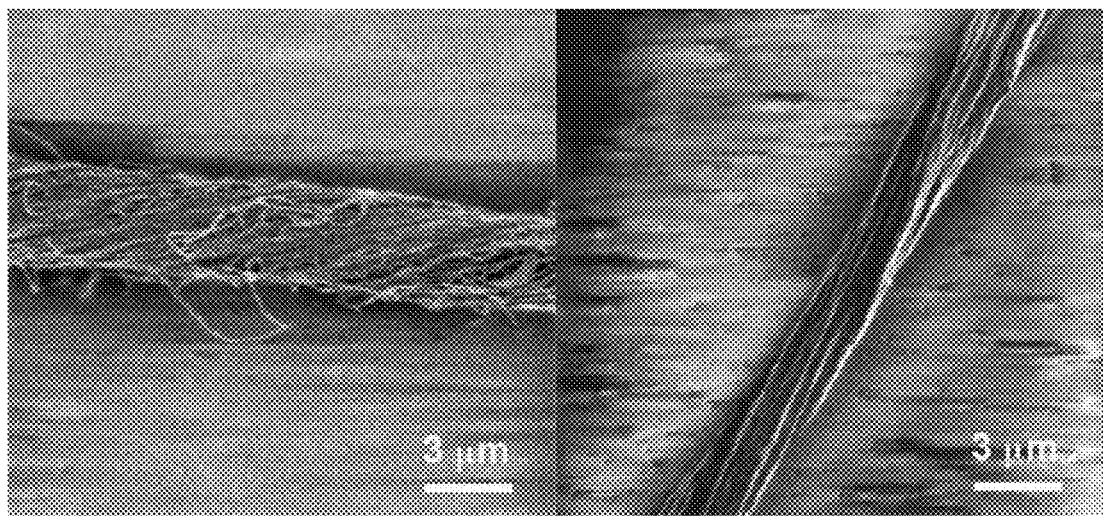
*Fig. 5a*  *Fig. 5b*

CARBON NANOTUBE FIBER SPUN FROM WETTED RIBBON

RELATED APPLICATIONS

This application claims the benefit of U.S. Provisional Patent Application Ser. No. 60/998,461 filed Oct. 2, 2007, hereby incorporated by reference.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to the preparation of carbon nanotube fiber by a wet-spinning method, and more particularly to the preparation of carbon nanotube fiber by drawing a ribbon from a support array of substantially aligned carbon nanotubes, wetting the ribbon with a liquid, and spinning a fiber from the wetted ribbon.

BACKGROUND OF THE INVENTION

Individual carbon nanotubes ("CNTs") are stronger than any other known material. CNTs with perfect atomic structures have a theoretical strength of above 100 GPa. In practice carbon nanotubes do not have perfect structures. CNTs have been prepared with a measured strength of greater than 60 GPa, and the strength may improve upon annealing. For comparison, Kevlar fibers currently used in bullet-proof vests have a strength of about 3 GPa, and carbon fibers used for making space shuttles and other aerospace structures have strengths of about 2-6.9 GPa.

While CNTs are extremely strong materials, current methods for preparing them result in lengths on the order of only a few millimeters. Processing these short CNTs to produce materials with more practical uses is an important challenge. Several approaches for processing CNTs into CNT fiber (sometimes referred to as CNT yarn) have been reported. One approach involves preparing an array of CNTs and dry spinning a fiber from the array. Other approaches involve dispersing CNTs in polymer or acid solutions and then spinning the CNTs into a fiber.

SUMMARY OF THE INVENTION

In accordance with the purposes of the present invention, as embodied and broadly described herein, the present invention includes a method for preparing fiber of carbon nanotubes. The method involves drawing carbon nanotubes away from a substantially aligned supported array of carbon nanotubes to form a ribbon of carbon nanotubes, wetting the ribbon of carbon nanotubes with liquid, and then spinning a fiber from the wetted ribbon, wherein spinning involves twisting wetted carbon nanotubes of the wetted ribbon around each other as carbon nanotubes are drawn away from said substantially aligned, supported array of carbon nanotubes The invention also includes a fiber prepared by a method that involves drawing carbon nanotubes away from a substantially aligned, supported array of carbon nanotubes to form a ribbon, wetting the ribbon with a liquid to form a wetted ribbon, and spinning a fiber from wetted ribbon, which comprises twisting the wetted carbon nanotubes of the wetted ribbon around each other as the wetted ribbon is drawn from the substantially aligned, supported array of carbon nanotubes. In an embodiment, when the liquid was poly(vinylalcohol) and the majority of the nanotubes were double walled having an average diameter of about 7 nanometers, after drying the fiber and curing the polymer, the fiber had a tensile strength of greater than 0.90 GPa.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 5 shows SEM images of (a) a CNT fiber dry spun from a 0.5 mm long array, and (b) a CNT fiber prepared by drawing a CNT ribbon from a dry 0.5 mm long array, wetting the ribbon with 1 percent solution of PVA, and then wet-spinning the wetted ribbon.

DETAILED DESCRIPTION

The invention is concerned with the preparation of a fiber of carbon nanotubes (CNTs) by spinning from a wetted ribbon of carbon nanotubes. An aspect of the invention is concerned with spinning the fiber of CNTs from a wetted ribbon of carbon nanotubes. Another aspect of the invention is concerned with fiber spun from the wetted ribbon. Fibers resulting from spinning from wetted ribbon according to this invention have a higher tensile strength and a higher conductivity than (i) CNT fibers dry spun directly from a CNT array, (ii) CNT fibers wet-spun from CNTs dispersed in a solution, and (iii) CNT fibers wet-treated by dip-coating after spinning the fiber.

Figure 1:
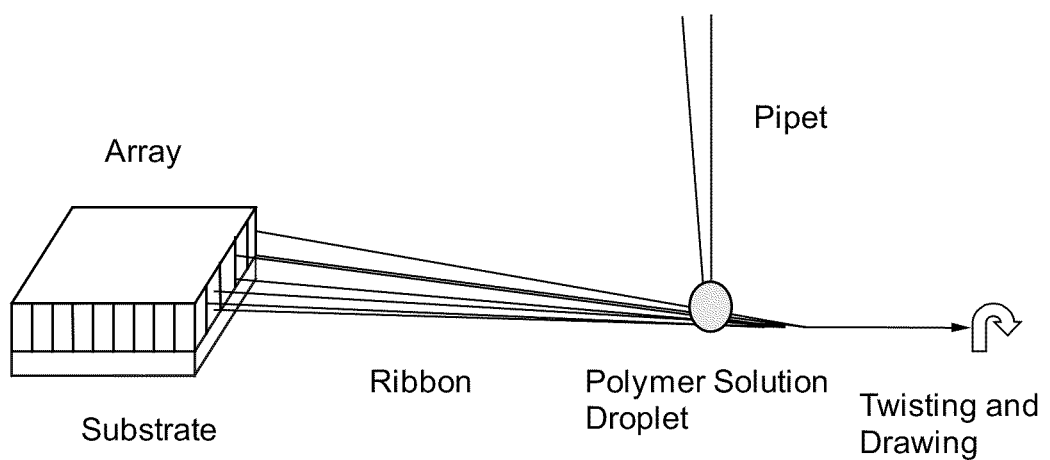
FIG. 1 shows a schematic representation of an embodiment of wet spinning a ribbon of CNTs drawn from an array.

An embodiment process of the invention is shown schematically in FIG. 1. Moving from left to right, CNTs are drawn away from an array of substantially aligned CNTs to form a ribbon of CNTs. Liquid is then applied to the ribbon. The wetted ribbon is then spun into fiber.

In the embodiment shown in FIG. 1, a pipette applies a drop of liquid to the ribbon. In other embodiments, wetted ribbon is produced by passing the ribbon through liquid or by spraying the ribbon with liquid. In an embodiment, the liquid can be a pure solvent that can be totally evaporated upon drying. In another embodiment, the liquid can be a polymer solution that leaves behind polymer after the evaporation of the solvent. In another embodiment, the liquid can be a solution of a monomer that leaves behind the monomer after evaporation of the solvent.

Catalyst structures were used to prepare the CNT arrays. In some embodiments, a CNT array was prepared using a catalyst structure having a silicon substrate, a thin layer of silicon dioxide ($SiO_2$) on the substrate, a thin layer of alumina ($Al_2O_3$) on the silicon dioxide layer, and a thin layer of iron on the alumina. In an embodiment, a catalyst structure having a Fe layer thickness of about 0.8 nm produced a CNT array where the majority of CNTs were double-walled and the average CNT diameter was about 7 nanometers (nm). The microstructure of the CNTs of the array is affected by changes in the thickness of the deposited layer of Fe catalyst. For example, when the thickness of the Fe catalyst layer increases, the CNT diameter and the number of walls of the CNTs increase.

The array was produced by placing the catalyst structure in a quartz tube furnace, heating the furnace to an elevated temperature, and sending forming gas and a source of carbon through the tube furnace. Forming gas is a nonflammable mixture of argon and hydrogen. In an embodiment, the forming gas composition was 6 percent hydrogen and 94 percent argon. Water vapor may be included in the gaseous mixture by passing a small amount of Ar gas through a water bubbler. The array of CNTs forms on the catalyst structure.

Hydrocarbons were used as sources of carbon for forming the CNT array. Some non-limiting examples of other suitable hydrocarbons include alkanes such as but not limited to methane, ethane, propane, butane, pentane, hexane (a liquid hydrocarbon); alkenes such as but not limited to ethylene and propylene; and alkynes such as but not limited to acetylene. Functionalized hydrocarbons may also be used as carbon sources. Some non-limiting examples of functionalized hydrocarbons include alcohols (ethanol, for example) ketones (acetone, for example), esters (ethyl acetate, for example), acids (acetic acid, for example), and the like. Hydrocarbons and functionalized hydrocarbons can be in the liquid phase or the liquid phase. A wide range of concentrations of the hydrocarbon (typically from about 20 percent to about 80 percent) are used along with a nonreactive gas such nitrogen or an inert gas such as argon or helium, or a mixture of gases, where the nonreactive gas is present in a concentration of from about 20 percent to about 80 percent.

Hydrogen is present in the feed in an amount less than 20 percent, in an amount less than or equal to about 10 percent, in an amount less than or equal to about 6 percent, in an amount less than or equal to about 5 percent or less, in an amount less than or equal to about 4 percent or less, and in an amount less than or equal to about 3 percent.

A typical growth temperature for a CNT array is in the range of from about 700 degrees Celsius to about 800 degrees Celsius. Another growth temperature is in the range of from about 730 degrees to about 780 degrees Celsius.

Arrays with good alignment, high purity and therefore strong inter-tube interaction are favorable for spinning. However, there appears to be a compromise among the array length, array purity, and array rigidity. Long, spinnable CNT arrays may be obtained at higher temperatures (780 degrees, for example) when water is added to the gaseous feed and when the growth is for a period of less than about 15 minutes.

Using a substantially aligned array of carbon nanotubes to prepare a composite fiber guarantees alignment in the spun composite fiber. The spinning twists the CNTs around each other and squeezes out excess liquid so that individual CNTs can be closely spaced together. The fiber spins at a rate of $\omega$ while being pulled into a ribbon a speed of v. The spinning parameters $\omega$ and v can be adjusted to optimize the fiber structure for highest strength. The as-spun fiber can be stretched to improve alignment of the nanotubes.

For the description that follows, unless specially mentioned, the CNT array used for forming wetted ribbon for fiber spinning was produced using a catalyst structure having a silicon substrate, a 100 nanometer (nm) thick silicon dioxide layer on a silicon substrate, a 10 nm thick aluminum oxide layer deposited by ion beam deposition (IBAD) onto the silicon dioxide layer, and a 0.8 nm thick Fe layer magnetron sputter deposited on the aluminum oxide layer. The catalyst structure was placed in the furnace. The furnace was heated to 750 degrees Celsius while an atmosphere of forming gas (composition of 6 percent hydrogen and 94 percent argon) was sent through the furnace. Upon reaching 750 degrees Celsius, ethylene was added to the forming gas to enable the growth of the CNT arrays. The CNT growth time was varied in order to vary the height of the CNT arrays. This growth time varied from 5 to 15 minutes. Arrays of different lengths were prepared. In an embodiment, a CNT array having an average CNT length of about 0.3 mm was prepared and used for fiber spinning. In another embodiment, a spun fiber was prepared from an array having CNTs of an average length of about 0.5 mm. In yet another embodiment, a spun fiber was prepared from an array having CNTs of an average length of about 0.6 mm. Arrays having an average CNT length of 1 mm, 1.5 mm, 2 mm, 2.5 mm, 3 mm, 3.5 mm, 4 mm, 4.5 mm, 5 mm, and longer can also be prepared and used for forming fiber.

After preparing the CNT array, CNTs from the array were drawn from the array. At the start, a CNT ribbon of a desired width was pulled away from the array with a pair of tweezers (the array can also be pulled using other methods/tools). The ribbon was attached to a microprobe tip that was rotated slowly and pulled away to lengthen the ribbon. The ribbon was then passed through a drop of liquid before twisting it into a fiber (see FIG. 1). For embodiments where the liquid was a polymer solution, the wet-spun fiber was then put into a vacuum oven at a temperature of about 75 degrees Celsius for 24 hours to dry the fiber and cure the polymer. The cured composite fibers of the invention were evaluated in tension to obtain the tensile strength, the dependency of the strength on the length (i.e. size effect), and the conductivity. The fibers were also examined using Scanning Electron Microscopy (SEM).

Figure 2:
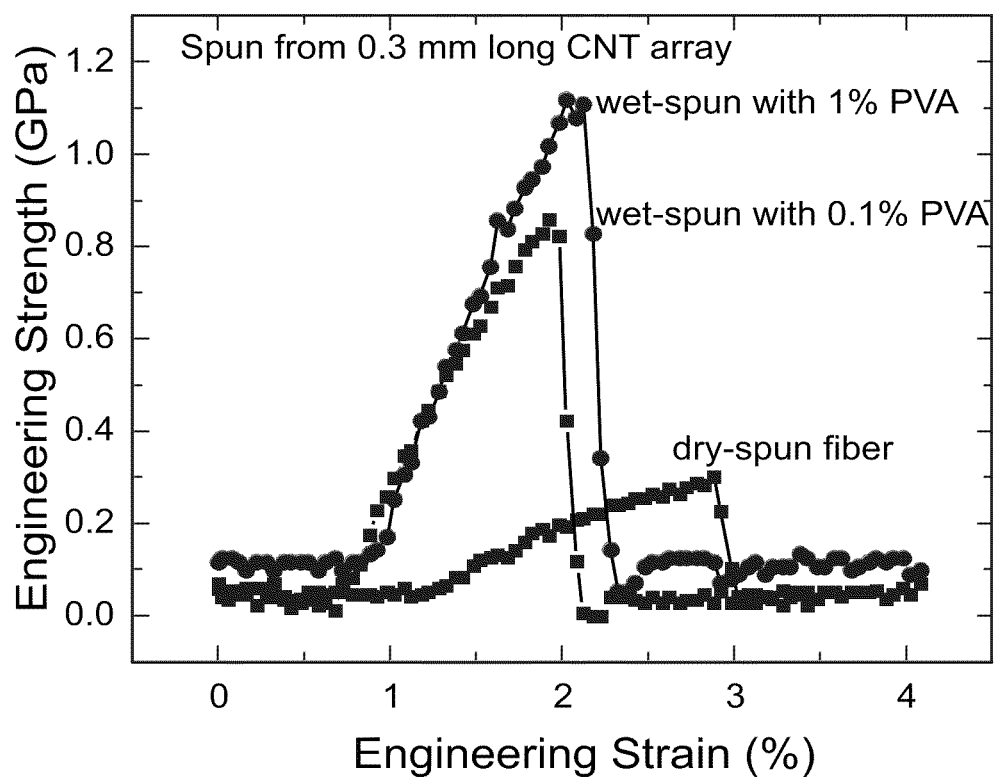
FIG. 2 shows stress-strain curves of (i) a CNT fiber that was dry-spun from a 0.3 mm long array, (ii) a CNT fiber prepared by drawing a CNT ribbon from a dry 0.3 mm long array, wetting the ribbon with 0.1 percent solution of poly(vinylalcohol) ("PVA"), and then wet-spinning the wetted ribbon, and (iii) a CNT fiber prepared by drawing a CNT ribbon from a dry 0.3 mm long array, wetting the ribbon with 1 percent solution of PVA, and then wet-spinning the wetted ribbon.

The drawing-wetting-spinning approach of the invention and the drawing-spinning-wetting approach of the prior art both provide a helical orientation of fibers that contributes to load transfer because the twisted nanotubes can squeeze radially against each other when the composite fiber is under load. This increases the bonding strength and consequently load-transfer efficiency. However, the drawing-wetting-spinning approach of the invention results in CNT fibers that have a higher tensile strength and conductivity compared to CNT fibers prepared by the drawing-spinning-wetting approach. The differences in the tensile strength are shown in the stress-strain curves of FIG. 2. FIG. 2 includes stress-strain curves of (i) a CNT fiber dry-spun from a 0.3 mm long array, (ii) a CNT fiber prepared by drawing a CNT ribbon from a dry 0.3 mm long array, wetting the ribbon with 0.1 percent solution of poly(vinylalcohol) ("PVA"), and then wet-spinning the wetted ribbon, and (iii) a CNT fiber prepared by drawing a CNT ribbon from a dry 0.3 mm long array, wetting the ribbon with 1 percent solution of PVA, and then wet-spinning the wetted ribbon. As FIG. 2 shows, the dry-spun fiber has a maximum engineering strength of only 0.25 gigapascal (GPa) at an engineering strain of 1.9 percent. The fibers wet spun according to the invention have much higher engineering strengths.

The maximum engineering strength of the wet-spun fiber prepared using the 0.1 percent solution of PVA, 0.81 GPa at an engineering strain of 1.8 percent. Still greater was the engineering strength of the CNT fiber prepared using a higher concentration of PVA in the wetting solution. The fiber prepared using 1 percent PVA wetting solution had a maximum engineering strength of 1.12 GPa at an engineering strain of 2.0 percent. The solvent for the PVA solutions was 50% water and 50% ethanol, by volume.

Figure 3:
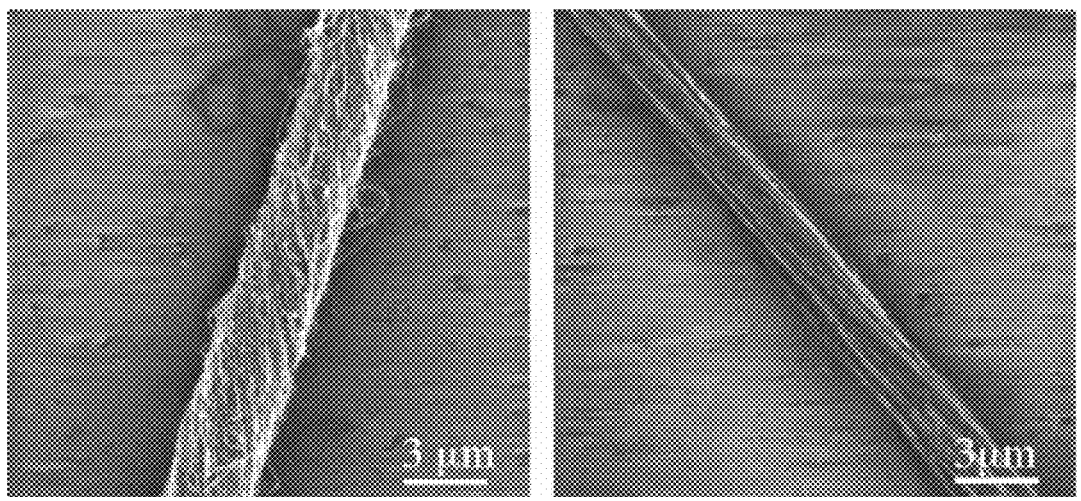
FIG. 3 shows scanning electron microscopy ("SEM") images of (a) a CNT fiber dry spun from a 0.3 mm long array, and (b) a CNT fiber prepared by drawing a CNT ribbon from a dry 0.3 mm long array, wetting the ribbon with 1 percent solution of PVA, and then wet-spinning the wetted ribbon.

FIG. 3a shows scanning electron microscope ("SEM") image of CNT fiber dry spun from a 0.3 mm long array (i.e. the dry-spun fiber whose stress strain curve is shown in FIG. 2) and the CNT fiber prepared by drawing a CNT ribbon from a dry 0.3 mm long array, wetting the ribbon with 1 percent solution of PVA, and then wet-spinning the wetted ribbon (whose stress strain curve is also shown in FIG. 2). Using essentially the same spinning parameters, the fibers drawn by the wet spinning approach have smaller diameters than those drawn by the dry spinning approach. Thus the CNT-CNT contact for the wet spun fibers is greater which contributes to increased load transfer between the CNTs and results in the greater tensile strengths of the fibers.

Figure 4:
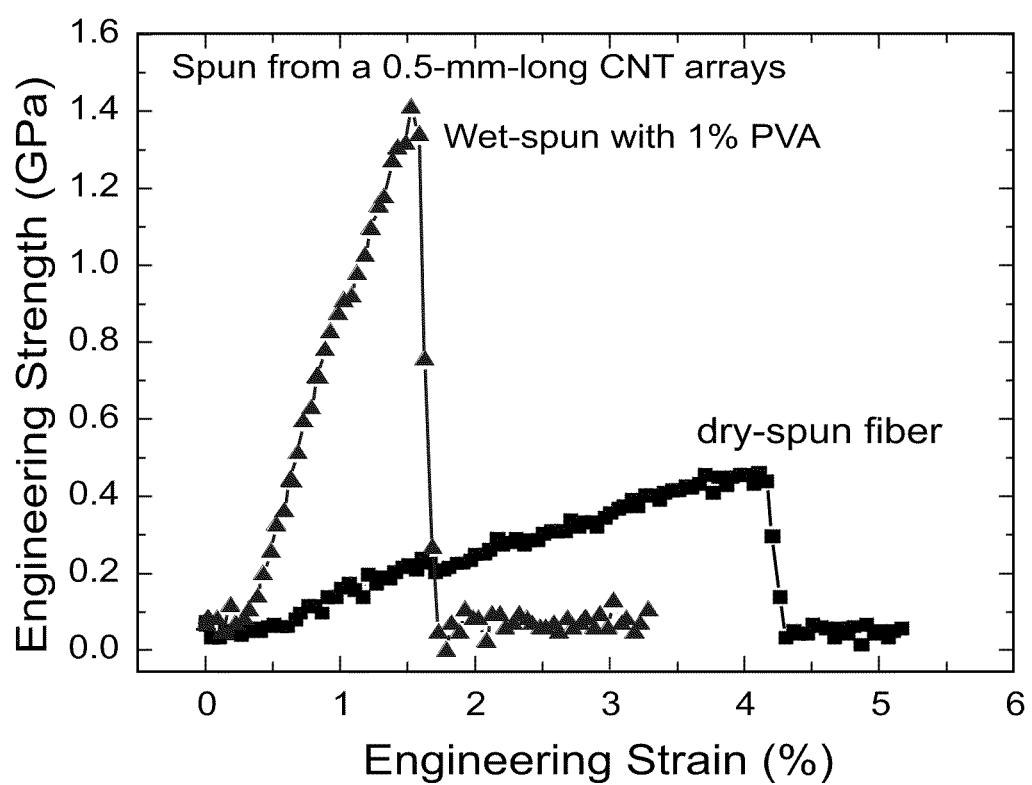
FIG. 4 shows stress-strain curves of (i) a CNT fiber dry-spun from 0.5 mm long array, and (ii) a CNT fiber prepared by drawing a CNT ribbon from a dry 0.5 mm long array, wetting the ribbon with 1 percent solution of PVA, and then wet-spinning the wetted ribbon.

FIG. 4 shows stress-strain curves of (i) a CNT fiber dry-spun from a dry 0.5 mm long array, and (ii) a CNT fiber prepared by drawing a CNT ribbon from a dry 0.5 mm long array, wetting the ribbon with 1 percent solution of PVA, and then wet-spinning the wetted ribbon. As FIG. 4 shows, the dry spun fiber has a maximum tensile strength of 0.5 GPa at an engineering strain of 4.2 percent while the wet-spun fiber has a maximum tensile strength of 1.42 at an engineering strain of 1.5 percent. A comparison of FIG. 4 with FIG. 2 shows that increasing the length of the array results in an increase in the tensile strength of the spun fiber, and wet-spun fibers are stronger (i.e. have a higher tensile strength) than dry-spun fibers.

FIG. 5 shows scanning electron microscope (SEM) images of (a) a CNT fiber dry spun from a 0.5 mm long array, and (b) a CNT fiber prepared by drawing a CNT ribbon from a dry 0.5 mm long array, wetting the ribbon with 1 percent solution of PVA, and then wet-spinning the wetted ribbon. The fibers prepared by the wet-spinning approach have smaller diameters and greater fiber-fiber contact than those prepared by the dry spinning approach.

TABLE 1 summarizes the improvement in tensile strength of CNT fibers spun from wetted ribbon as compared to the tensile strength of fiber dry-spun directly from a supported array of CNTs. The CNTs from each array were 0.6 mm in length. Liquids include pure solvents (ethanol, chloroform) and various polymer solutions (solution of conducting polymer, solution of non-conducting polymer, aqueous solution, nonaqueous solution). Fibers prepared using polymer solutions were baked at 75 degrees Celsius for 24 hours to cure the polymer. Methanol and isopropanol gave equivalent results compared to ethanol.

TABLE 1

| Liquid (% by weight/weight) | Percentage (%) increase in tensile strength |
|---|---|
| Ethanol (reagent grade) | 97 |
| Chloroform (reagent grade) | 104 |
| 0.68% Poly(3-hexylthiophene) in chloroform (10 mg/ml) | 159 |
| 2% polyimide in N-Methyl-2-Pyrolidinone | 182 |
| 0.2% poly(vinylpyrrolidone) ("PVP") in aqueous ethanol (ethanol/water = 50/50 by volume) (2 mg/ml) | 226 |
| 1.1% Polystyrene in tetrahydrofuran (1 mg/ml) | 271 |
| 1% poly(vinylalcohol) ("PVA") in ethanol | 307 |
| 1% DEVCON ™ epoxy in chloroform | 324 |

TABLE 2 compares the strength of fibers prepared by dip-coating or by spinning a fiber from a wetted ribbon according to this invention. The length of the array used to spin all of the fibers was 0.6 mm. Entries 2, 3, and 4 report the molecular weight "M" of PVA in units of kiloDaltons ("kDa"). The dip-coating method, which was reported by Zhang et al. in Science, vol. 306, 2004, p. 1358, a involves immersing CNTs into a coating solution and then pulling the CNTs out of the solution.

TABLE 2

| | Dip-coating | | Spin from wetted ribbon | |
|---|---|---|---|---|
| Fiber spinning conditions | Diameter (micrometers) | Tensile Strength (GPa) | Diameter (micrometers) | Tensile Strength (GPa) |
| Dry-spun fiber | 4.6 | 0.327(±0.02) | 7.3 | 0.434(±0.04) |
| 0.1% PVA (M = 50 kDa) in alcohol solution | 4.3 | 0.423(±0.02) | 4.2 | 0.61((±0.05) |
| 1.0% PVA (M = 50 kDa) in alcohol solution | 3.9 | 0.483(±0.02) | 3.8 | 0.926(±0.02) |
| 2% PVA (M = 19 5kDa, 20 mg/ml) in alcohol solution | 3.3 | 0.574(±0.03) | 3.8 | 0.904(±0.02) |
| 0.2% PVP in alcohol | 4.3 | 0.505(±0.02) | 3.1 | 0.56(±0.07) |
| 1% epoxy in chloroform | 3.6 | 0.547(±0.03) | 3.3 | 0.823(±0.04) |

From TABLE 2, data indicate that CNT fibers spun from the wetted ribbon always have a much higher tensile strength than fibers prepared using the dip-coating method. One possible explanation for the higher strength observed for fibers of the invention is that fiber spun from wetted ribbon has more uniformly coated CNTs than does fiber produced by the known dip-coating method. Another possible explanation for the higher strength is that wetting before spinning makes it easier for individual CNTs to have a closer contact with each other due to capillary force, and this leads to higher CNT volume fraction and better inter-tube load transfer.

The CNT fiber resistances were measured at room temperature using the following procedure. The CNT fiber was first transferred onto the surface of a clean glass slide, and then the two ends of the fiber were covered with silver paste and dried for a couple of hours. The silver paste ends served as electrodes. Measurements were taken after the silver electrodes were dried for a couple of hours. TABLE 3 below shows a comparison of electrical conductivity of CNT fibers prepared by dry-spinning and wet-spinning using several liquids, including polymer solutions. The same width of ribbon was used to prepare each of the fibers.

TABLE 3

| Sample | Diameter (micrometers) | Tensile Strength (GPa) | Strain (%) | Resistance (kΩ) | Length (mm) | σ (S/cm) |
|---|---|---|---|---|---|---|
| Dry-spun fiber | 5.0 | 0.27 | 3 | 44.6 | 17.6 | 201 |
| ethanol | 3.3 | 0.58 | 2.7 | 54.9 | 17.6 | 375 |
| 1% PVA in ethanol | 3.3 | 0.78 | 3.3 | 67.9 | 19.4 | 334 |
| $CH_3Cl$ | 3.3 | 0.58 | 3 | 48.4 | 17.0 | 411 |
| 1% epoxy in $CHCl_3$ | 3.3 | 0.86 | 3 | 62.8 | 11.6 | 216 |

Using the same width ribbon being pulled from an array, the diameter for each wet-spun fiber was always less than that for the dry-spun fiber. In addition, the conductivity for each wet-spun fiber was greater than the conductivity of the dry-spun fiber. Thus, the spinning fiber from wetted ribbon appears to improve both the mechanical and the electrical properties of the fiber compared to spinning from dry carbon nanotubes.

CNT fibers spun from wetted ribbon drawn from a support array of substantially aligned CNTs can be used for a wide variety of application. The fibers can be used to prepare superior laminates, woven textiles, and other structural fiber composite articles. Fiber composites of this invention could be used to prepare strong and light armor for aircraft, missiles, space stations, space shuttles, and other high strength articles. The reduced weight would allow aircraft and projectiles to fly faster and for longer distances. These features are also important for spacecraft for future space missions (to the moon and to Mars, for example), where high strength and lightweight features of the composite fibers are very important.

In summary, fibers were prepared by spinning a wetted ribbon of carbon nanotubes. The ribbon was drawn from a relatively rigid, high-purity array with good CNT alignment. When the wetting liquid was a polymer solution, after removing the solvent and curing the polymer, the resulting fiber had a higher tensile strength and higher conductivity compared to a dry spun fiber. The conductivity is also higher than for fiber prepared from CNTs soaked in polymer solution, and for fibers prepared when the liquid is applied to a fiber during the spinning.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for spinning a fiber of carbon nanotubes, comprising:
    drawing carbon nanotubes away from a substantially aligned, supported array of carbon nanotubes to form a ribbon, the array of carbon nanotubes having an average carbon nanotube height of about 0.3 mm or about 0.5 mm,
    the carbon nanotubes having an average diameter of about 7 nm and a majority of the carbon nanotubes being double-walled carbon nanotubes,
    wetting the ribbon of carbon nanotubes with a liquid polymer present at from about 0.1% to about 2% to form a wetted ribbon of carbon nanotubes,
    spinning a fiber from said wetted ribbon of carbon nanotubes, wherein spinning comprises twisting wetted carbon nanotubes of the wetted ribbon around each other as carbon nanotubes are drawn away from said substantially aligned, supported array of carbon nanotubes,
    the fiber having an tensile strength greater by at least about 5% as compared to a fiber prepared by immersing a supported array of carbon nanotubes in the liquid comprising a polymer and spinning the carbon nanotubes into a fiber under comparable conditions, and
    the fiber having a tensile strength of greater than 0.90 GPa.

2. The method of claim 1, wherein the step of wetting the carbon nanotubes of the ribbon occurs before the carbon nanotubes are spun into a fiber.

3. The method of claim 1, wherein the step of wetting occurs as carbon nanotubes are being twisted around each other during the spinning step.

4. The method of claim 1, further comprising drying the fiber.

5. The method of claim 1, wherein the liquid comprises an organic liquid, an inorganic liquid, or a combination of organic liquid and inorganic liquid.

6. The method of claim 1, wherein the liquid is chosen from a hydrocarbon, a halogenated hydrocarbon, an alcohol, an ester, and ether, an amide, and an acid.

7. The method of claim 1, wherein the liquid comprises a polymer dissolved in solvent.

8. The method of claim 1, wherein the liquid comprises a solution of poly(vinylalcohol).

9. The method of claim 1, wherein the liquid comprises a polymer dissolved in a solvent, and wherein the method after spinning the fiber from the wetted ribbon further comprises removing the solvent and curing the polymer.

10. The method of claim 1, wherein the liquid comprises a monomer dissolved in solvent.

11. The method of claim 1, wherein the liquid comprises a monomer dissolved in a solvent, and wherein the method after spinning a fiber from a wetted ribbon further comprises removing the solvent and polymerizing the monomer to a polymer.

12. The method of claim 1, wherein the liquid comprises a monomer dissolved in a solvent, and wherein the method after spinning a fiber from a wetted ribbon further comprises removing the solvent, polymerizing the monomer to a polymer, and curing the polymer.

13. The method of claim 1, further comprising preparing a substantially aligned, supported array of carbon nanotubes.

14. The method of claim 1, wherein the step of wetting the ribbon with liquid comprises passing the ribbon through a liquid, spraying the ribbon with a liquid, or passing the ribbon through a supersaturated vapor.

15. The method of claim 1, wherein the fiber has a tensile strength that is greater than the tensile strength of a fiber spun from said method excluding the step of wetting the ribbon.

16. The method of claim 1, wherein the majority of the carbon nanotubes of the substantially aligned, supported array of carbon nanotubes are doublewalled carbon nanotubes.

17. A fiber of carbon nanotubes prepared by a method comprising:
- drawing carbon nanotubes away from a substantially aligned, supported array of carbon nanotubes to form a ribbon, the array of carbon nanotubes having an average carbon nanotube height of about 0.3 mm or about 0.5 mm,
- the carbon nanotubes having an average diameter of about 7 nm, and a majority of the carbon nanotubes being double-walled carbon nanotubes;
- wetting the ribbon with a liquid comprising a polymer present at from about 0.1% to about 2% to form a wetted ribbon,
- spinning a fiber from wetted ribbon, wherein spinning comprises twisting the carbon nanotubes of the wetted ribbon around each other as the carbon nanotubes are drawn away from the substantially aligned, supported array of carbon nanotubes,
- the fiber having an tensile strength greater by at least about 5% as compared to a fiber prepared by immersing a supported array of carbon nanotubes in the liquid comprising a polymer and spinning the carbon nanotubes into a fiber under comparable conditions, and
- the fiber having a tensile strength of greater than 0.90 GPa.

18. The fiber of claim 17, wherein the majority of the carbon nanotubes have an average diameter of about 7 nanometers.

19. The fiber of claim 17, wherein the polymer comprises poly(vinylalcohol).

20. The fiber of claim 17, wherein the fiber has a smaller diameter compared to a fiber prepared by immersing a supported array of carbon nanotubes in the liquid comprising the polymer and spinning the carbon nanotubes into a fiber under comparable conditions.

21. A method of preparing a fiber of carbon nanotubes, comprising:
- drawing carbon nanotubes away from a substantially aligned, supported array of carbon nanotubes to form a ribbon, the array of carbon nanotubes having an average carbon nanotube height of about 0.3 mm or about 0.5 mm,
- the carbon nanotubes having an average diameter of about 7 nm and the majority of the carbon nanotubes being double-walled carbon nanotubes,
- wetting the ribbon with a liquid comprising a polymer present at from about 0.1% to about 2% to form a wetted ribbon,
- spinning a fiber from wetted ribbon, wherein spinning comprises twisting the carbon nanotubes of the wetted ribbon around each other as the carbon nanotubes are drawn away from the substantially aligned, supported array of carbon nanotubes,
- the fiber having an tensile strength greater by at least about 5% as compared to a fiber prepared by immersing a supported array of carbon nanotubes in the liquid comprising a polymer and spinning the carbon nanotubes into a fiber under comparable conditions, and
- the fiber having a tensile strength of greater than 0.90 GPa.

22. The method of claim 21, wherein the polymer comprises poly(vinylalcohol).

\* \* \* \* \*